US010007059B2

(12) United States Patent
Abel et al.

(10) Patent No.: US 10,007,059 B2
(45) Date of Patent: Jun. 26, 2018

(54) SEMICONDUCTOR STRUCTURE

(71) Applicant: International Business Machines Corporation, Armonk, NY (US)

(72) Inventors: Stefan Abel, Zurich (CH); Jean Fompeyrine, Waedenswil (CH); Chiara Marchiori, Birmensdorf (CH)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/602,610

(22) Filed: May 23, 2017

(65) Prior Publication Data
US 2017/0254950 A1 Sep. 7, 2017

Related U.S. Application Data

(63) Continuation of application No. 14/945,752, filed on Nov. 19, 2015, now Pat. No. 9,696,488.

(30) Foreign Application Priority Data

Nov. 19, 2014 (GB) .................................. 1420531.4

(51) Int. Cl.
*G02B 6/12* (2006.01)
*G02B 6/13* (2006.01)
(Continued)

(52) U.S. Cl.
CPC ............... *G02B 6/122* (2013.01); *G02B 6/13* (2013.01); *G02F 1/035* (2013.01);
(Continued)

(58) Field of Classification Search
CPC ............ G02B 2006/12142; G02B 2006/12047
See application file for complete search history.

(56) References Cited

U.S. PATENT DOCUMENTS 7,718,516 B2  5/2010  Hao et al.
2002/0172464 A1  11/2002  Delwala

FOREIGN PATENT DOCUMENTS

WO  WO2011047370 A1  4/2011
WO  WO2013086047 A1  6/2013

OTHER PUBLICATIONS

Xiong et al., "Active silicon integrated nanophotonics: ferroelectric BaTiO3 devices," Nano Lett. 14(3), pp. 1419-1425 (Feb. 2014).
(Continued)

*Primary Examiner* — Jerry Rahll
(74) *Attorney, Agent, or Firm* — David M. Quinn; Michael J. Chang, LLC

(57) ABSTRACT

A semiconductor structure is provided, the semiconductor structure comprising: a semiconductor substrate processed to comprise at least an optical aspect comprising at least a silicon photonics device and at least an electronic aspect comprising at least an electronic device; at least an interlayer dielectric layer provided on the semiconductor substrate, and at least an electrically interconnecting layer provided on the interlayer dielectric layer, wherein: the semiconductor structure further comprises at least a functional-oxide crystalline layer provided in relation to the interlayer dielectric layer before the interconnecting layer is provided on the interlayer dielectric layer, the functional-oxide crystalline layer comprising at least a functional-oxide material and is processed to comprise at least an active optical device, and the interlayer dielectric layer comprises a first surface and a second surface, the first surface being in common to at least a respective part of the optical aspect and the electronic aspect.

17 Claims, 2 Drawing Sheets

(51) Int. Cl.
*G02B 6/122* (2006.01)
*G02F 1/035* (2006.01)

(52) U.S. Cl.
CPC .............. *G02B 2006/12047* (2013.01); *G02B 2006/12061* (2013.01); *G02B 2006/12142* (2013.01)

(56) References Cited

OTHER PUBLICATIONS

Baek et al., "Epitaxial integration of perovskite-based multifunctional oxides on silicon," Acta Materialia, vol. 61, issue 8, pp. 2734-2750 (May 2013).
Vilquin et al., "Integration of functional oxides on silicon for novel devices," IEEE 1st International Symposium on Access Spaces (Jun. 2011), pp. 294-298.
Wolfram et al., "Design of a Silicon Integrated Electro-Optic Modulator Using Ferroelectric BaTiO3 Films," IEEE Photonics Technology Letters, vol. 26; No. 13, pp. 1344-1347, ISSN 1041-1135 (Jul. 2014).
Sanchis et al., "Silicon CMOS Compatible Transition Metal Dioxide Technology for Boosting Highly Integrated Photonic Devices with Disruptive Performance," 16th International Conference on Transparent Optical Networks, pp. 1-4; Conference Proceedings Article; doi:10.1109/ICTON.2014.6876505; 1452 (Jul. 2014).
List of IBM Patents or Applications Treated as Related (2 pages).

SEMICONDUCTOR STRUCTURE

CROSS-REFERENCE TO RELATED APPLICATION(S)

This application is a continuation of U.S. application Ser. No. 14/945,752 filed on Nov. 19, 2015, now U.S. Pat. No. 9,696,488, which claims benefit of priority of U.K. Patent Application Number GB 1420531.4, filed on Nov. 19, 2014, the disclosures of which are incorporated by reference herein.

TECHNICAL FIELD

The present invention relates to a semiconductor structure and also extends to a method of fabricating such a structure.

BACKGROUND

Silicon photonics is a baseline technology that may be applicable for addressing a bandwidth bottleneck occurring in relation to future electronic circuits and/or systems. Silicon photonic circuits are based on many different elementary devices that may be applied for manipulating light. In a usual scenario, many of these elementary devices operate based on a change in the refractive index of one of their constituent materials, by applying an electrical field or current thereto.

One of the main functions implemented in silicon photonic circuits is light modulation by converting an electrical signal into an optical signal. Additionally, it is anticipated that silicon photonic circuits will rely on resonant structures with defined critical dimensions. Deviation from such critical dimensions may occur due to variations in fabrication processing and/or due to variations in an operating temperature. It is, therefore, desirable to provide devices in silicon photonic circuits that offer compensation to variability at low speed, below kHz, and at low power, or that enable optical modulation with power consumption below 1 mW/Gbps. Ideally, such devices are fabricated with materials exhibiting a relatively large, linear electro-optic effect also known as Pockels effect.

It is known that functional oxides such as the perovskites, for example, barium titanate $BaTiO_3$ and potassium niobate $KNbO_3$, exhibit a variety of properties related to their crystal and electronic structures. Such properties include, for example, piezoelectricity, magnetoresistance, superconductivity and electro-optical activity. Whilst the use of such functional oxides in electro-optic modulators is known, integration within silicon photonic circuits has not yet been reported. By co-integrating active optical devices based on such functional oxides together with passive devices fabricated within silicon photonic circuits, particularly the unique electro-optical properties of such functional oxides could be exploited. In this regard, it is desirable that light coupling elements such as waveguides in the passive circuitry are in relatively close proximity to the active optical devices based on the functional oxides so that light coupling is enabled with increased efficiency and reduced loss. It is also desirable that active optical devices based on functional-oxide materials are placed in close proximity to electronic devices in the circuitry to enable higher speed operation.

In order to be used in respect of devices and/or applications exhibiting reduced power consumption and/or increased efficiency light modulation, or compensation devices, it is desirable that a given functional-oxide material exhibits a relatively high Pockels coefficient. In this regard, it should be taken into consideration that the Pockels effect strongly depends on the crystalline axis of a functional-oxide layer incorporating the functional-oxide material. The requirements to integrate such a functional-oxide layer include: an ordered, epitaxially crystalline structure; relatively good insulation properties, which include avoiding the passage of any electrical currents through the functional-oxide layer; a given orientation of its crystalline axis with respect to the position of the electrodes that are used to modify the refractive index thereof so as to obtain a desired electro-optic effect, and reduced optical loss.

It is envisioned that devices based on such functional-oxides will be part of the silicon photonics technology. Silicon photonics chips will most likely contain optically active and passive devices co-integrated with electronic devices fabricated using standard CMOS technology. The electronic and photonic parts of the chips share the same front-end-of-line (FEOL) and back-end-of-line (BEOL) processes. FEOL may be defined as the part of the process where isolated devices are fabricated and BEOL as the part of the process where isolated devices are electrically interconnected.

It may be envisioned to place the functional oxide, crystalline layer during the FEOL that is used for fabricating silicon photonic devices and electronic devices. However, it is likely that such a layer and its interfaces would degrade when exposed to the relatively high temperatures used for FEOL processing, for example, during the activation anneal of the implanted source/drain region. In this regard, and by way of example, the processing temperatures used in the FEOL are T>700-800° C.

Alternatively, the functional-oxide, crystalline layer may be integrated into the BEOL of the process. This approach may, however, suffer from severe limitations on the thermal budget allowed on the integration and/or the processing of devices based on functional oxides since BEOL processing temperatures are lower, for example, T<400° C., compared to the temperatures that may be used for obtaining functional oxides such as perovskites with desired electro-optical properties, typically 500° C. Also, the functional-oxide, crystalline layer would be spatially remote from the silicon photonic layer/circuitry fabricated during the FEOL, so that the optical coupling between the silicon photonics and the functional-oxide layer may be virtually impossible.

Reference is now made to U.S. Pat. No. 7,718,516 B2, which discloses a method for growing $SrTiO_3$ films with single (110) out of plane orientation upon a silicon surface substrate, comprising: crystallising an Sr-silicate interfacial layer epitaxially onto the silicon substrate under low oxygen pressure for about 1 to 5 minutes at a temperature of about 760 degrees centigrade to avoid oxidation of the silicon substrate, and depositing the $SrTiO_3$ film at low oxygen pressure at a temperature of about 760 degrees centigrade.

WO 2011047370 A1 discloses a nanostructure comprising: a layer of a functional oxide deposited on a semiconductor substrate and having a substantially annular configuration, the functional oxide having a metal-insulator transition property that causes a drop in resistance of about four or more orders of magnitude at a predetermined temperature; and a nano-ring covering the layer of the functional oxide, the nano-ring comprising a metallic material.

WO 2013086047 A1 discloses an integrated semiconductor device having integrated circuits respectively formed on different semiconductor integrated dies, comprising: a carrier substrate structured to form openings on a top side of the carrier substrate; semiconductor integrated circuit dies fixed to bottom surfaces of the openings of the carrier substrate, each semiconductor integrated circuit die including a semiconductor substrate and at least one integrated circuit formed on the semiconductor substrate to include one or more circuit components, and each semiconductor integrated circuit die being structured to have a top surface substantially coplanar with the top side of the carrier substrate; and planar layers formed on top of the top surfaces of the semiconductor integrated circuit dies and the top side of the carrier substrate to include optical waveguides and photonic devices to provide (1) intra-die optical connectivity for photonic devices associated with a semiconductor integrated circuit die, or (2) inter-die optical connectivity for photonic devices associated with different semiconductor integrated circuits dies.

The document titled, "Active silicon integrated nanophotonics: ferroelectric $BaTiO_3$ devices", by Xiong et al. published at URL: http://arxiv.org/ftp/arxiv/papers/1401/1401.4184.pdf, pages 1 to 20, 2014, discloses nanophotonics circuits incorporating ferroelectric $BaTiO_3$ thin films on a ubiquitous silicon-on-insulator (SOI) platform. Epitaxial, single-crystalline $BaTiO_3$ grown directly on SOI and engineer integrated waveguide structures are grown that simultaneously confine light and an RF electric field in the $BaTiO_3$ layer. Using on-chip photonic interferometers, a large effective Pockels coefficient of 213±49 pm/V was extracted, a value more than six times larger than found in commercial optical modulators based on lithium niobate. The monolithically integrated $BaTiO_3$ optical modulators showed modulation bandwidth in the gigahertz regime, which was considered to be promising for broadband applications.

Other previously-proposed devices and/or systems are disclosed in the documents: "Epitaxial integration of perovskite-based multifunctional oxides on silicon", by Baek et al. published at Acta Mater (2012), URL: http://dx.doi.org/10.1016/j.actamat.2012.09.073, "Integration of functional oxides on silicon for novel devices", by Vilquin et al. published in the 2011 1$^{st}$ International Symposium on Access Spaces, (ISAS), IEEE-ISAS 2011, pages 294 to 298, and "Integration of functional oxide thin film heterostructures with silicon (100) substrates", published at URL: http://www.researchgate.net/publication/234300609 Integration of functional oxide thin film heterostructures with silicon (100) substrates, 1/2010.

The documents mentioned above do not, whether taken individually or in any combination with each other, disclose how to address the challenge(s) of integrating functional oxides with silicon photonics technology.

SUMMARY

According to an embodiment of a first aspect of the present invention, there is provided a semiconductor structure comprising: a semiconductor substrate that is processed to comprise at least an optical aspect comprising at least a silicon photonics device and at least an electronic aspect comprising at least an electronic device; at least an interlayer dielectric layer that is provided on the semiconductor substrate, and at least an electrically interconnecting layer that is provided on the interlayer dielectric layer, wherein: the semiconductor structure further comprises at least a functional-oxide crystalline layer that is provided in relation to the interlayer dielectric layer before the interconnecting layer is provided on the interlayer dielectric layer, the functional-oxide crystalline layer comprising at least a functional-oxide material and is processed to comprise at least an active optical device having a given electro-optical property, and the interlayer dielectric layer comprises at least two surfaces, a first surface and a second surface, the first surface being provided substantially adjacent with the semiconductor substrate thereby to be in common to at least a respective part of the optical aspect and the electronic aspect.

An embodiment of the present invention may facilitate the integration and use of functional oxides with electronic devices such as CMOS devices and silicon-photonic technologies on a common platform. Particularly, active optical devices based on functional oxides may be co-integrated with passive devices fabricated within silicon-photonic circuits. Thus, the scope of application of silicon-photonics technology may be further widened, especially in optical applications, by exploiting the electro-optical properties of functional oxides.

Preferably, the functional-oxide crystalline layer is provided in relation to the interlayer dielectric layer in a temporal window substantially between fabricating the interlayer dielectric layer and processing the interconnecting layer. By way of this feature, the functional-oxide crystalline layer may be integrated and/or processed at a temperature such that it has the desired properties as discussed hereinabove. This is done without damage to the functional-oxide crystalline layer by exposure to the higher temperatures that are used for fabricating, particularly, the circuits/devices in the electronic and optical aspect of the semiconductor substrate and/or being restricted in thermal budget by the lower temperatures, which are typically used for processing the interconnecting layer.

According to an embodiment the optical aspect may also be denoted as a region or optical region of the semiconductor device comprising at least a silicon photonics device. According to an embodiment the electronic aspect may also be denoted as a region or electronic region of the semiconductor device comprising at least an electronic device.

Desirably, the functional-oxide crystalline layer is provided in relation to at least one of the first and second surfaces of the interlayer dielectric layer. This feature may serve to extend the versatility and scope of application of an embodiment of the present invention since the functional-oxide crystalline layer need not be restrictedly provided with respect to any given surface of the interlayer dielectric layer. In this way, the active optical device of the functional-oxide crystalline layer is in relatively close proximity to: the electronic aspect, thereby to facilitate higher speed operation, and to the optical aspect so optical coupling may be performed with increased efficiency and reduced optical signal loss.

Preferably, and in with respect to a first configuration of an embodiment of the present invention, the functional-oxide crystalline layer is provided on the second surface of the interlayer dielectric layer that is adjacent to the interconnecting layer. This feature facilitates increased ease of integration and/or fabrication of the functional-oxide crystalline layer in an embodiment of the present invention.

Desirably, in the first configuration of an embodiment of the present invention, the functional-oxide crystalline layer is provided in a stacked structure that is wafer-bonded onto the second surface of the interlayer dielectric layer. Since the stacked structure may be independently formed from the other layers in an embodiment of the present invention and then wafer-bonded onto the second surface of the interlayer dielectric layer, this feature provides increased ease of integration of the functional-oxide crystalline layer and overall ease of fabrication.

In respect of the first configuration of an embodiment of the present invention, preferably at least a part of the stacked structure is removed after the stacked structure is wafer-bonded to the second surface of the interlayer dielectric layer. In one example, the functional-oxide crystalline layer is grown onto a donor wafer layer that is removed once the stacked structure is wafer-bonded onto the second surface of the interlayer dielectric layer. Thus, the functional-oxide layer is transferred with ease and without the need for special processing steps and/or equipment. In another example, layers may be present between the functional-oxide crystalline layer and the donor wafer layer that may hinder the optical properties of an embodiment of the present invention by promoting increased optical loss. Such layers may also be removed, by etching, for example, after or together with the donor wafer layer after the stacked structure is wafer-bonded to the second surface of the interlayer dielectric layer.

With respect to the first configuration of an embodiment of the present invention, and more preferably, the stacked structure comprises a silicon dioxide layer, a barium titanate layer and a silicon donor wafer layer.

Desirably, and with respect to a second configuration of an embodiment of the present invention, the functional-oxide crystalline layer is provided in relation to the first surface of the interlayer dielectric layer adjacent with the semiconductor substrate. This may need more consideration in the way of processing than is the case for the above-mentioned first configuration where the functional-oxide crystalline layer is provided on the second surface of the interlayer dielectric layer adjacent to the interconnecting layer. Nevertheless, it extends the advantage that the active optical device of the functional-oxide crystalline layer is positioned in closer proximity to the semiconductor substrate and the various aspects thereof. An advantage associated with this feature is that optical coupling between the active optical device and the optical aspect of the semiconductor substrate may be improved.

In the second configuration of an embodiment of the present invention, the functional oxide crystalline layer is preferably integrated within the interlayer dielectric layer thereby to be provided substantially in contact with one of: at least a crystalline surface of the semiconductor substrate and at least the optical aspect of the semiconductor substrate. Since the functional oxide crystalline layer may be provided with different possibilities relative to the semiconductor substrate and the electronic and optical aspects thereof, this feature may serve to broaden the flexibility and scope of application of an embodiment of the present invention. Where the functional-oxide crystalline layer is formed in contact with a given electronic device of the electronic aspect, such a device may be configured to drive a given active optical device in the functional-oxide crystalline layer.

Desirably, the interconnecting layer is processed to comprise at least a passive device configurable to electrically connect at least the active optical device of the functional-oxide crystalline layer to at least a given part of the semiconductor substrate. The interconnecting layer is processed to comprise metal interconnect levels that are configurable to electrically connect the functional-oxide crystalline layer to at least one of the electronic aspect and optical aspect and the afore-mentioned aspects to each other. Because substantially the same metal interconnect levels are used to make desired electrical connections, this feature imparts the advantages of ease of operation and fabrication to an embodiment of the present invention.

Preferably, an embodiment of the present invention is configurable to optically connect at least the active optical device of the functional-oxide crystalline layer to a given part of the semiconductor substrate with at least a given optical coupling technique. In addition to being electrically connected with the semiconductor substrate, the functional-oxide crystalline layer may also be optically coupled thereto. This can be done via a variety of different optical coupling techniques, such as, for example, evanescent coupling, grating coupling or other such suitable techniques. By using a dedicated optical coupling technique, the issues regarding decoupling electrical and optical signals between the functional-oxide crystalline layer and semiconductor substrate are reduced.

Preferably, the functional-oxide crystalline layer in an embodiment of the present invention comprises one of: a crystalline layer, a polycrystalline layer, a heterostructure and a superlattice. In this way, the compatibility of an embodiment of the present invention with well-established, cost-effective and mass-fabrication processing techniques is increased.

Desirably, an embodiment of the present invention is configurable to modify the given electro-optical property of the functional-oxide material with a given externally-applied stimulus. The functional-oxide material may be chosen on account of exhibiting specific electro-optical activity, optical non-linearities, optically driven metal-insulator transitions, which is tunable and/or modifiable with magnetic, optical, mechanical, stimuli. This feature may further enhance the performance and/or broaden the scope of application, versatility and performance of an embodiment of the present invention. In respect of this feature, and preferably, the functional-oxide crystalline layer is provided in relation to the interlayer dielectric layer so that the given electro-optical property is enhanced as desired. By a given integration of the functional-oxide crystalline layer in an embodiment of the present invention, for example, an orientation of the crystal axis versus electrodes, utilization of strain enhancement effects, the effect(s) of the given electro-optical property exhibited by the functional-oxide material may be further enhanced as desired.

Desirably, the interlayer dielectric layer in an embodiment of the present invention has a surface roughness of up to 1 nm. By way of this feature, the surface roughness of the second surface of the interlayer dielectric layer is relatively low so that the subsequent wafer-bonding of the functional-oxide crystalline layer thereon may be done with increased efficiency, reliability and quality.

Preferably, the functional-oxide material in an embodiment of the present invention comprises at least a perovskite. As discussed earlier, perovskites exhibit a relatively large variety of properties, including having relatively large associated electro-optic effects. In order to exploit this and to extend the versatility of an embodiment of the present invention, the functional-oxide material is chosen to comprise at least a given perovskite.

Desirably, the functional-oxide crystalline layer in an embodiment of the present invention comprises at least a barium titanate layer. Barium titanate has a relatively large associated electro-optic effect. Making it the basis of the functional-oxide crystalline layer enhances the implementation of an embodiment of the present invention in optical applications and/or optical devices. In this respect, and more preferably, a thickness of the barium titanate layer is in a range of 100 nm to 10 nm, which imparts increased compatibility with the growth methods used for producing barium titanate layers of relatively high quality. Furthermore, such a thickness range is chosen on account of facilitating the use of relatively low operating voltages in the active optical devices of the functional-oxide crystalline layer. Also, by using such a thickness range, an increased overlap of the optical power with a region having the functional-oxide material may occur, so enabling an enhanced efficiency of the electro-optical effect associated with the functional-oxide material.

According to an embodiment of a second aspect of the present invention, there is provided a method for fabricating a semiconductor structure comprising: providing a semiconductor substrate that is processed to comprise at least an optical aspect that comprises at least a silicon photonics device and at least an electronic aspect comprising at least an electronic device; forming at least an interlayer dielectric layer on the semiconductor substrate, and forming at least an electrically interconnecting layer on the interlayer dielectric layer, wherein the method further comprises: providing at least a functional-oxide crystalline layer in relation to the interlayer dielectric layer before the interconnecting layer is formed on the interlayer dielectric layer, the functional-oxide crystalline layer comprising a functional-oxide material and being processed to comprise at least an active optical device having at least a given electro-optical property, and in forming the interlayer dielectric layer, the interlayer dielectric layer is formed thereby to comprise at least two surfaces, a first surface and a second surface, the first surface being provided substantially adjacent with the semiconductor substrate so as to be in common to at least a respective part of the optical aspect and the electronic aspect.

According to an embodiment of a third aspect of the present invention, there is provided a semiconductor structure obtainable by a method according to embodiments of the second aspect of the invention.

Features of one aspect may be applied to another aspect and vice versa. Any of the embodiments shown and/or described may be combined with each other. This is also possible for one or more features of the embodiments.

BRIEF DESCRIPTION OF THE DRAWINGS

Reference will now be made, by way of example, to the accompanying drawings, in which.

DETAILED DESCRIPTION

Figure 1:
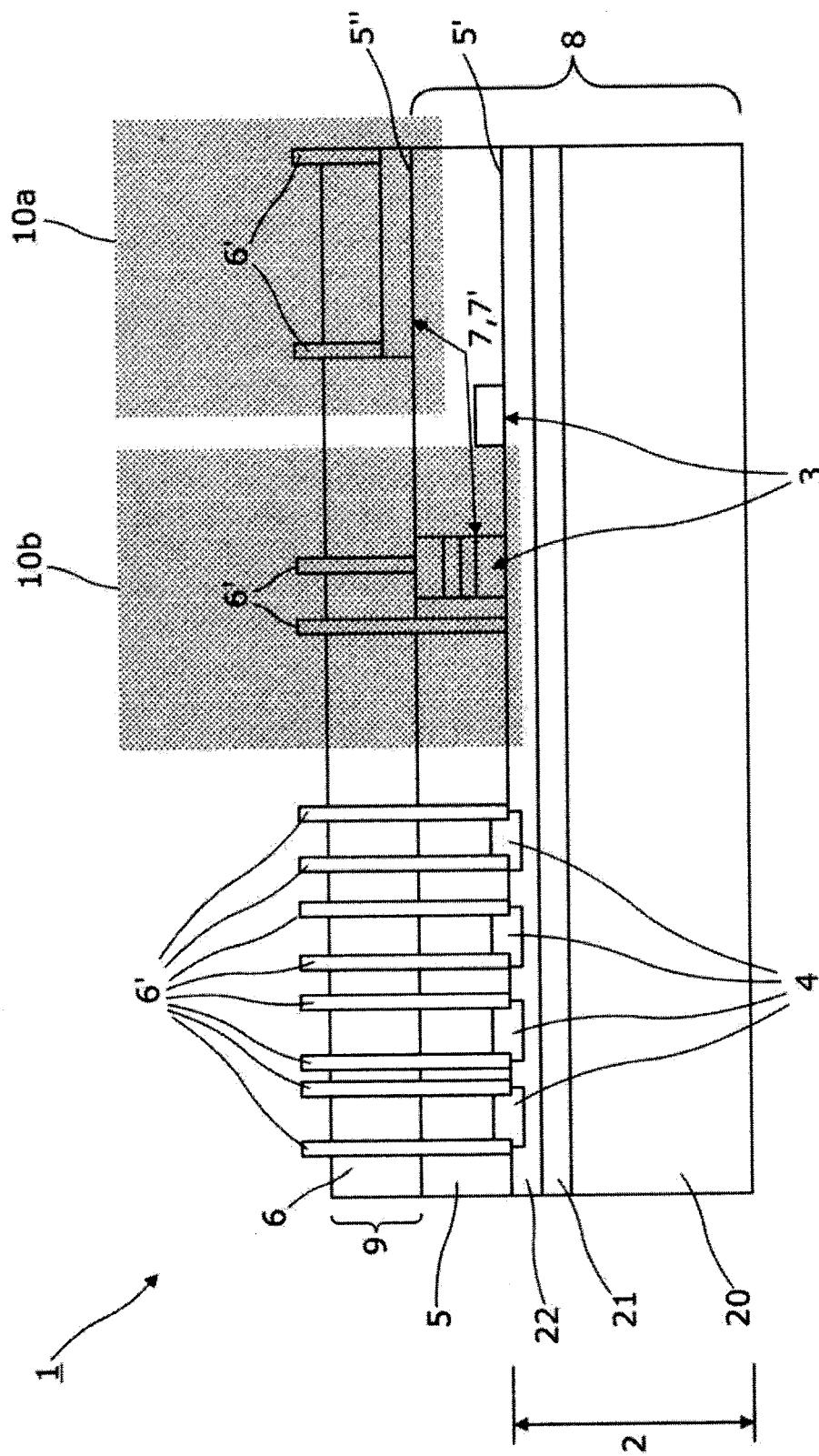
FIG. 1 schematically illustrates different configurations according to an embodiment of the present invention.

Within the description, the same reference numerals or signs have been used to denote the same parts or the like.

As can be seen from FIG. 1, a semiconductor structure 1 according to an embodiment of the present invention comprises a semiconductor substrate 2, which may be provided in a multi-layered configuration 20, 21, 22 of consecutively arranged layers of silicon 20, silicon dioxide 21 and a silicon substrate 22. The semiconductor substrate 2 is processed at a temperature of 700° C. to 1100° C. to comprise at least an optical aspect 3 comprising at least a silicon photonics device and at least an electronic aspect 4 comprising at least an electronic device 4. In the example shown in FIG. 1, the optical aspect 3 comprises multiple silicon photonic devices that are optical waveguides 3 and the electronic aspect 4 comprises multiple electronic transistors 4. On the processed semiconductor substrate 2, 3, 4, there is provided an interlayer dielectric layer 5—also known as a pre-metal dielectric—having a first surface 5' and a second surface 5". By way of example, the interlayer dielectric layer may comprise silicon dioxide. The interlayer dielectric layer 5 is arranged such that its first surface 5' is arranged to be provided substantially in common to the silicon photonics devices 3 and the electronic devices 4 of the semiconductor substrate 2. The second surface 5" of the interlayer dielectric layer 5 is planarised to have a surface roughness that is up to 1 nm. An interconnecting layer 6 is then deposited onto the second surface 5" of the interlayer dielectric layer 5 and processed at a temperature of <450° C. to comprise at least a passive device 6' that is generally a metal interconnect level 6' and specifically a via 6' in the example of FIG. 1. The material constitution of the interconnecting layer 6 may be aluminium and/or copper, possibly with W/TiN liner.

A functional-oxide crystalline layer 7 is provided in relation to at least one of the first and second surfaces 5', 5" of the interlayer dielectric layer 5. It is provided in a temporal window that is substantially between fabrication of the FEOL platform 8 comprising the processed semiconductor substrate 2, 3, 4 and the interlayer dielectric layer 5 and the BEOL platform 9 comprising the processed interconnecting layer 6, 6'.

In an embodiment of the present invention, the functional-oxide crystalline layer 7 is formed as a thin-film with a thickness that may range from a few micrometers to one atomic layer. It may comprise one of: a crystalline layer, a polycrystalline layer, a heterostructure and a superlattice. The functional-oxide crystalline layer comprises a functional-oxide material that is processed to comprise at least an active optical device 7' having at least a given electro-optical property, which is tuneable and/or modifiable by a given externally-applied stimulus which may be magnetic, optical or mechanical. The functional-oxide crystalline layer 7 is integrated such that the effect(s) of the given electro-optical property of the functional-oxide material may be further enhanced as desired, for example, by an orientation of the crystal axis versus electrodes that are used for the application of an electrical field or current to the functional-oxide crystalline layer, utilisation of strain enhancement effects and such like. The functional-oxide material is chosen on account of having a relatively large associated electro-optic effect and as satisfying at least one or more of the following conditions when used to form the functional-oxide crystalline layer: an ordered epitaxially crystalline structure; relatively good insulation properties, which include avoiding the passage of any electrical currents through the functional-oxide crystalline layer; an orientation of its crystalline axis with respect to the position of the electrodes that are used to modify the refractive index thereof so as to obtain a desired electro-optic effect, and reduced optical loss. In a preferred embodiment of the present invention, the functional-oxide material comprises at least a given perovskite material in the form of a barium titanate layer having a thickness in a range of 100 nm to 10 nm. Regarding the deposition of the functional-oxide crystalline layer 7, this may be done with thin-film technology such as, for example, molecular beam epitaxy, chemical vapour phase epitaxy, atomic layer epitaxy, atomic layer deposition, pulsed laser deposition, sputtering and sol-gel deposition or any other appropriate technique. The functional-oxide crystalline layer 7 is structured by using the alignment features of the semiconductor substrate 2 and/or any aspects or parts thereof, thereby to form active optical devices 7' in the photonic or plasmonic domain such as, for example, modulators, switches, resonators, filters, waveguides, detectors, tuning elements, bi- or multi-stable elements.

Consideration is now given to how connections, whether electrical or optical, are established in the semiconductor structure 1. In this regard, the wiring scheme of the BEOL platform 9 of the semiconductor structure 1, namely, the passive devices/metal interconnect levels/vias 6' of the interconnecting layer 6, are configurable to electrically connect the active optical devices 7' of the functional-oxide crystalline layer 7 to the FEOL platform 8 of the semiconductor structure 1. Also, and advantageously, the electronic devices 4 and the silicon photonic devices 3 are also electrically connectable via the same wiring scheme of the BEOL platform 9. Connections within the layers of the FEOL platform 8 may also be used to connect such layers to the active optical devices 7' of the functional-oxide crystalline layer 7.

Reference is now made to a specific first configuration 10a of an embodiment of the present invention, which is schematically illustrated in FIG. 1. According to the first configuration 10a, the functional-oxide crystalline layer 7 is formed on the second surface 5" of the interlayer dielectric layer 5. The functional-oxide crystalline layer 7 may comprise a single-crystalline or polycrystalline functional-oxide material. The functional-oxide crystalline layer 7 is then processed so that active optical devices 7' based on the specific electro-optical properties of the constituent functional-oxide material(s) of the functional-oxide crystalline layer 7 are formed. The active optical devices 7' are electrically connected to the electronic devices 4 in the FEOL platform 8 with the metal interconnects/wirings 6' of the interconnect layer 6 in the BEOL platform 9. The active devices 7' may be optically connected to the silicon photonics devices 3 in the FEOL platform 8 by evanescent coupling, grating coupling and other such optical coupling techniques. Alternatively, or additionally, such electrical and/or optical connections can be made to other devices located within layers deposited during the fabrication of the BEOL platform 9.

It is preferred to form the functional-oxide crystalline layer 7 in the first configuration 10a of an embodiment of the present invention in a stacked structure that is wafer-bonded onto the second surface 5" of the interconnecting layer 5. Regarding the structural composition of the stacked structure, it may comprise the functional-oxide crystalline layer 7 grown on a donor wafer layer and then a bonding interface layer being formed on the free surface of the functional-oxide crystalline layer 7. The stacked structure is then wafer-bonded with the bonding interface layer being provided on the second surface 5" of the interlayer dielectric layer 5. The donor wafer layer and any interfacial layer are then removed.

In a preferred implementation of the first configuration 10a and with reference being made to FIG. 1, the functional-oxide crystalline layer 7 comprises at least a functional-oxide material that has electro-optical properties. Optical switches 7' are fabricated on the functional-oxide crystalline layer 7, which is then integrated onto the Si-CMOS FEOL platform 8 comprising transistors 4 and optical waveguides 3. In this regard, and by way of example, the functional-oxide crystalline layer 7 may be chosen to comprise a crystalline, barium titanate layer with Pockels coefficients close to the following values in pm/V: r13=20, r33=97, r42=800. The crystalline, barium titanate layer 7 is epitaxially grown onto a silicon donor wafer layer and then covered with a bonding interface layer comprising an amorphous oxide, such as, silicon dioxide, for example. This stacked structure is then wafer bonded with the bonding interface layer being provided adjacent with the planarised second surface 5" of the interlayer dielectric layer 5 using molecular wafer bonding under conditions of room temperature and ambient pressure. The silicon donor wafer layer is then removed by wet etching, milling or Smart Cut®. The transferred barium titanate layer 7 is then processed to comprise one or more electro-optical switches 7' that are connected as hereinbefore described to the different aspects of the FEOL platform 8 by the back-end metallisation of the BEOL platform 9.

Reference is now made to a specific second configuration 10b of an embodiment of the present invention, which is shown in FIG. 1. According to the second configuration 10b, the functional-oxide crystalline layer 7 is provided in relation to the first surface 5' of the interlayer dielectric layer 5 that substantially terminates a crystalline surface of the semiconductor substrate 2 also comprising the electronics devices 4 and silicon photonics devices 3. Specifically, in the second embodiment 10b, the functional-oxide crystalline layer 7 is provided substantially in contact with one of: the crystalline surface of the semiconductor substrate 2 as hereinbefore defined and at least the optical aspect 3. This may be done by: monolithically integrating the functional-oxide crystalline layer 7 onto the crystalline surface of the semiconductor substrate 2 using an epitaxial growth mechanism, for example, after etching part of the interlayer dielectric layer 5 down to the crystalline surface of the semiconductor substrate 2 or to an interlayer between the interlayer dielectric layer 5 and the crystalline surface, or by depositing the functional-oxide crystalline layer 7 onto the crystalline surface before deposition of the interlayer dielectric layer 5. Various deposition techniques may be used to deposit the functional-oxide crystalline layer 7 and the processing conditions thereof may lead to the deposition of epitaxial or polycrystalline functional-oxide crystalline layer 7. The functional-oxide crystalline layer 7 present within the FEOL platform 8 is then processed into one or a multiple of active optical devices 7', which have given electro-optical properties. The active optical devices 7' thus formed are electrically connected to the CMOS devices 4 in the FEOL platform 8 and/or to other devices in the BEOL platform 9 using the metal interconnects/wirings 6' of the interconnect layer 6 in the BEOL platform 9. For optically connecting the functional-oxide crystalline layer 7, if necessary, similar techniques to those described hereinabove with reference to the first configuration 10a may be used. Additionally, connections to other parts of the FEOL platform 8 can be made through direct connections that have already been prepared during fabrication of the FEOL platform 8, such as, for example, highly-doped channels. In the example of the second configuration 10b shown in FIG. 1, it can be clearly seen that the functional-oxide crystalline layer 7 is provided as part of a heterostructure.

The first and second configurations 10a, 10b may also be combined in an embodiment of the present invention and this is clearly illustrated in FIG. 1.

Figure 2:
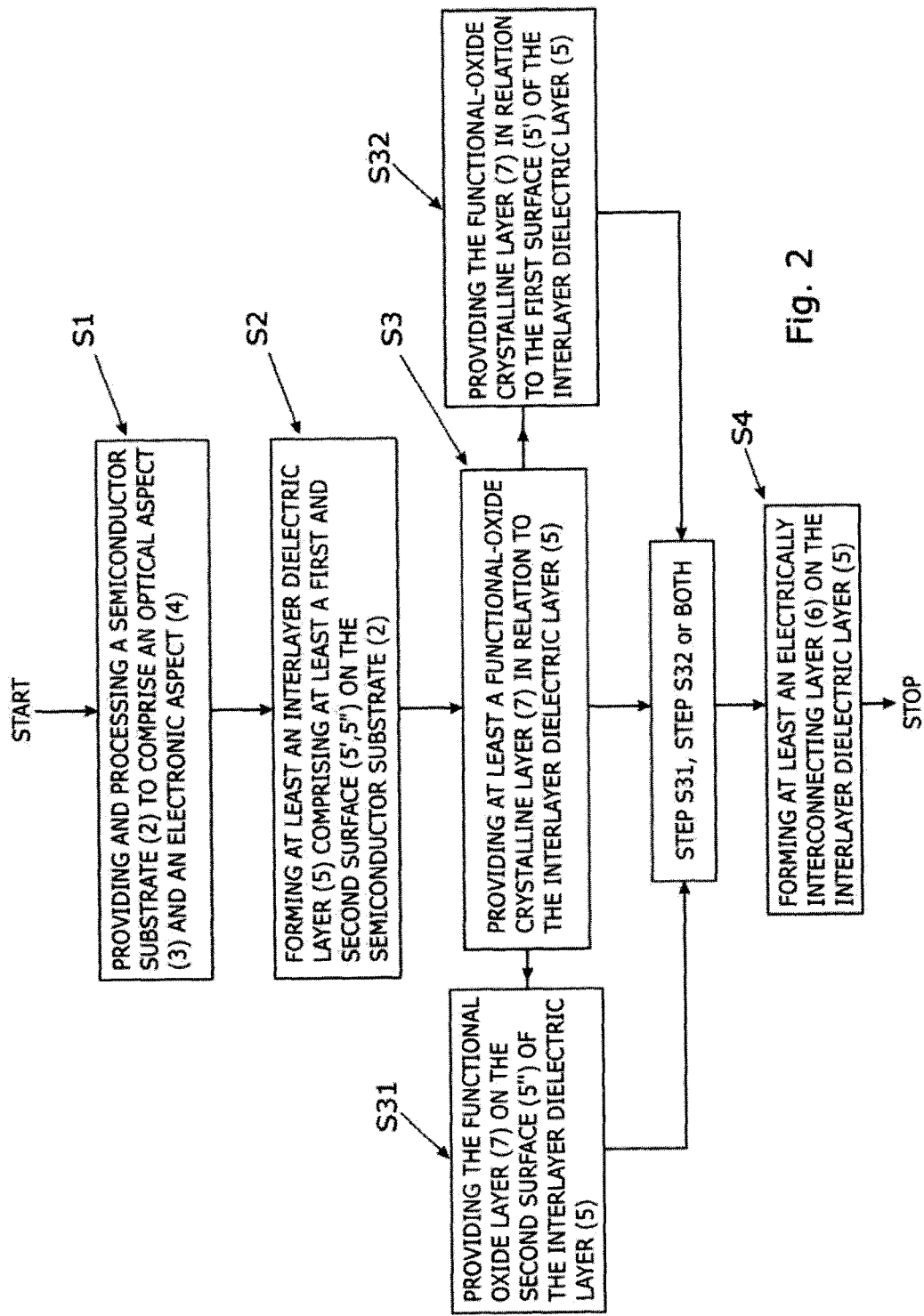
FIG. 2 is a flowchart that schematically illustrates method steps according to an embodiment of the present invention.

Reference is now made to FIG. 2 that shows a flowchart of method steps according to an embodiment of the present invention to provide for the semiconductor structure 1 described with reference to FIG. 1 hereinabove.

In a step S1, a semiconductor substrate 2 is provided and processed to comprise at least an optical aspect 3 comprising at least a silicon photonics device 3 and at least an electronic aspect 4 comprising at least an electronic device 4. Processing of the semiconductor substrate 2 is done at a temperature of 700° C. to 1100° C. thereby to comprise at least one of the optical aspect 3 and electronic aspect 4. In a preferred embodiment of step S1, the optical aspect 3 is provided by multiple silicon photonic devices that are optical waveguides 3 and the electronic aspect 4 is provided by multiple electronic transistors 4. In the step S1, the semiconductor substrate 2 may be provided in a multi-layered configuration 20, 21, 22 of consecutively arranged layers of silicon 20, silicon dioxide 21 and a silicon substrate 22 as shown in and described with reference to FIG. 1.

In a step S2, an interlayer dielectric layer 5 comprising at least two surfaces, a first surface 5' and a second surface 5", is provided on the processed semiconductor substrate 2, 3, 4. The first surface 5' of the interlayer dielectric layer 5 is provided substantially adjacent with the semiconductor substrate 2 so as to be in common to at least a respective part of the optical aspect 3 and the electronic aspect 4. The second surface 5" of the interlayer dielectric layer 5 is planarised to have a surface roughness that is up to 1 nm.

In a step S3, at least a functional-oxide crystalline layer 7 is provided in relation to the interlayer dielectric layer 5. The functional-oxide crystalline layer 7 is formed as a thin film with a thickness that may range from a few micrometers to one atomic layer. It may comprise one of: a crystalline layer, a polycrystalline layer, a heterostructure and a superlattice. The functional-oxide crystalline layer 7 comprises a functional-oxide material that is processed to comprise at least an active optical device 7' having at least a given electro-optical property, which is tuneable and/or modifiable by a given externally-applied stimulus, for example, magnetic, optical or mechanical. The functional-oxide crystalline layer 7 is integrated such that the effect(s) of the given electro-optical property of the functional-oxide material may be further enhanced as desired, for example, by an orientation of the crystal axis versus electrodes that are used for the application of an electrical field or current to the functional-oxide crystalline layer 7, utilisation of strain enhancement effects and such like. The functional-oxide material is chosen on account of having a relatively large associated electro-optic effect and as satisfying at least one or more of the following conditions when used to form the functional-oxide crystalline layer 7: an ordered epitaxially crystalline structure; relatively good insulation properties, which include avoiding the passage of any electrical currents through the functional-oxide crystalline layer 7; an orientation of its crystalline axis with respect to the position of the electrodes that are used to modify the refractive index thereof so as to obtain a desired electro-optic effect, and reduced optical loss. In a preferred embodiment of the present invention, the functional-oxide material comprises at least a given perovskite material in the form of a barium titanate layer having a thickness in a range of 100 nm to 10 nm. Regarding the deposition of the functional-oxide crystalline layer 7, this may be done with thin-film technology such as, for example, molecular beam epitaxy, chemical vapour phase epitaxy, atomic layer epitaxy, atomic layer deposition, pulsed laser deposition, sputtering and sol-gel deposition or any other appropriate technique. The functional-oxide crystalline layer 7 is structured by using the alignment features of the semiconductor substrate 2 and/or any aspects or parts thereof, thereby to form active optical devices 7' in the photonic or plasmonic domain such as, for example, modulators, switches, resonators, filters, waveguides, detectors, tuning elements, bi- or multi-stable elements.

In a step S4, at least an electrically interconnecting layer 6 is formed on the second surface 5" of the interlayer dielectric layer 5. Step S4 may further comprise processing the electrically interconnecting layer 6 at a temperature of <450° C. thereby to comprise at least a passive device 6' configurable to electrically connect at least the active optical device 7' of the functional-oxide crystalline layer 7 to at least a given part of the semiconductor substrate 2. In a preferred embodiment, the passive device 6' is generally a metal interconnect level 6' and, specifically, a via 6' as shown in FIG. 1.

As is clearly illustrated in FIG. 2, step S3 in which the functional-oxide crystalline layer 7 is provided in an embodiment of the present invention, is performed in a temporal window that falls substantially between steps S2 and S4, that is, between fabrication of the FEOL platform 8 comprising the processed semiconductor substrate 2, 3, 4 and the interlayer dielectric layer 5 and the BEOL platform 9 comprising the processed interconnecting layer 6, 6'.

In step S3, the functional-oxide crystalline layer is provided in relation to at least one of the first surface 5' and second surface 5" of the interlayer dielectric layer 5. In this regard, a step S31, corresponding to configuration 10a in FIG. 1, may be performed in which the functional-oxide crystalline layer 7 is formed on the second surface 5" of the interlayer dielectric layer 5 that is adjacent to the interconnecting layer 6. The functional-oxide crystalline layer 7 may comprise a single-crystalline or polycrystalline functional-oxide material. As part of step S31 or in a further step, the functional-oxide crystalline layer 7 is processed so that active optical devices 7' based on the specific electro-optical properties of the constituent functional-oxide material(s) of the functional-oxide crystalline layer 7 are formed. As part of step S31 or in further steps, the active optical devices 7' are electrically connected to the electronic devices 4 in the FEOL platform 8 with the metal interconnects/wirings 6' of the interconnect layer 6 in the BEOL platform 9. As part of step S31 or in further steps, the active devices 7' may be optically connected to the silicon photonics devices 3 in the FEOL platform 8 by evanescent coupling, grating coupling and other such optical coupling techniques. Alternatively, or additionally, such electrical and/or optical connections can be made to other devices located within layers deposited during the fabrication of the BEOL platform 9.

In a preferred execution of step S31, the functional-oxide crystalline layer 7 is provided in a stacked structure that is wafer-bonded onto the second surface 5" of the interlayer dielectric layer 5. At least a part of the stacked structure is then removed after the wafer-bonding is done. Regarding the stacked structure, it preferably comprises a silicon dioxide layer, a barium titanate layer and a silicon donor wafer layer in an embodiment of the present invention. Regarding the structural composition of the stacked structure, it may comprise the functional-oxide crystalline layer 7 grown on a donor wafer layer and then a bonding interface layer being formed on the free surface of the functional-oxide crystalline layer 7. The stacked structure is then wafer-bonded with the bonding interface layer being provided on the second surface 5" of the interlayer dielectric layer 5. The donor wafer layer and any interfacial layer are then removed.

In step S31, and in conjunction with the description of the first configuration 10a shown in FIG. 1, the functional-oxide crystalline layer 7 comprises at least a functional-oxide material that has electro-optical properties. Optical switches 7' are fabricated on the functional-oxide crystalline layer 7, which is then integrated onto a Si-CMOS FEOL platform 8 comprising transistors 4 and optical waveguides 3. In this regard, and by way of example, the functional-oxide crystalline layer 7 may be chosen to comprise a crystalline, barium titanate layer with Pockels coefficients close to the following values in pm/V: r13=20, r33=97, r42=800. The crystalline, barium titanate layer 7 is epitaxially grown onto a silicon donor wafer layer and then covered with a bonding interface layer comprising an amorphous oxide, such as, silicon dioxide, for example. This stacked structure is then wafer bonded with the bonding interface layer being provided adjacent with the planarised second surface 5" of the interlayer dielectric layer 5 using molecular wafer bonding under conditions of room temperature and ambient pressure. The silicon donor wafer layer is then removed by wet etching, milling or Smart Cut®. The transferred barium titanate layer 7 is then processed to comprise one or more electro-optical switches 7' that are connected as hereinbefore described to the different aspects of the FEOL platform 8 by the back-end metallisation of the BEOL platform 9.

As mentioned earlier, the functional-oxide crystalline layer 7 may be provided in relation to the first surface 5' of the interlayer dielectric layer 5 adjacent with the semiconductor substrate 2. In this respect, in a step S32 corresponding with the configuration 10*b* described hereinabove with reference to FIG. 1, the functional-oxide crystalline layer 7 is integrated within the interlayer dielectric layer 5 so that it is provided substantially in contact with one of: at least a crystalline surface of the semiconductor substrate 2 and at least the optical aspect 3 of the semiconductor substrate 2. This may be done by: monolithically integrating the functional-oxide crystalline layer 7 onto the crystalline surface of the semiconductor substrate 2 using an epitaxial growth mechanism, for example, after etching part of the interlayer dielectric layer 5 down to the crystalline surface of the semiconductor substrate 2 or to an interlayer between the interlayer dielectric layer 5 and the crystalline surface, or by depositing the functional-oxide crystalline layer 7 onto the crystalline surface before deposition of the interlayer dielectric layer 5. Various deposition techniques may be used to deposit the functional-oxide crystalline layer 7 and the processing conditions thereof may lead to the deposition of epitaxial or polycrystalline functional-oxide crystalline layer 7. As part of step S32 or in a further step, the functional-oxide crystalline layer 7 present within the FEOL platform 8 is then processed into one or a multiple of active optical devices 7', which have given electro-optical properties. As part of step S32 or in further steps, the active optical devices 7' thus formed are electrically connected to the CMOS devices 4 in the FEOL platform 8 and/or to other devices in the BEOL platform 9 using the metal interconnects/wirings 6' of the interconnect layer 6 in the BEOL platform 9. For optically connecting the functional-oxide crystalline layer 7, if necessary, similar techniques to those described hereinabove with reference to the first configuration 10*a* may be used. Additionally, connections to other parts of the FEOL platform 8 can be made through direct connections that have already been prepared during fabrication of the FEOL platform 8, such as, for example, highly-doped channels.

In the method steps described above, either one or both of steps S31 and S32 may be performed. Where they are both performed, this may be done simultaneously or in a desired sequence.

The terms "first" and "second" in the description and/or claims have been used to distinguish between different, but related, configurations, aspects and/or parts of an embodiment of the present invention. They do not, however, impart a particular order and/or importance in such use.

The present invention has been described purely by way of example and modifications of detail can be made within the scope of the invention.

Each feature disclosed in the description, and where appropriate, the claims and the drawings may be provided independently or in any appropriate combination.

What is claimed is:

1. A semiconductor structure comprising: a semiconductor substrate that is processed to comprise at least an optical aspect comprising at least a silicon photonics device and at least an electronic aspect comprising at least an electronic device; at least an interlayer dielectric layer that is provided on the semiconductor substrate, and at least an electrically interconnecting layer that is provided on the interlayer dielectric layer, wherein: the semiconductor structure further comprises at least a functional-oxide crystalline layer that is provided in relation to the interlayer dielectric layer before the interconnecting layer is provided on the interlayer dielectric layer, the functional-oxide crystalline layer comprising at least a functional-oxide material and is processed to comprise at least an active optical device having a given electro-optical property, and the interlayer dielectric layer comprises at least two surfaces, a first surface and a second surface, the first surface being provided substantially adjacent with the semiconductor substrate thereby to be in common to at least a respective part of the optical aspect and the electronic aspect, wherein the functional-oxide crystalline layer is integrated within the interlayer dielectric layer thereby to be provided substantially in contact with at least the optical aspect of the semiconductor substrate with the functional-oxide crystalline layer integrated monolithically on top of at least the optical aspect of the semiconductor substrate.

2. The semiconductor structure as claimed in claim 1 wherein the functional-oxide crystalline layer is provided in relation to at least one of the first and second surfaces of the interlayer dielectric layer.

3. The semiconductor structure as claimed in claim 1 wherein the functional-oxide crystalline layer is provided on the second surface of the interlayer dielectric layer that is adjacent to the interconnecting layer.

4. The semiconductor structure as claimed in claim 3 wherein the functional-oxide crystalline layer is provided in a stacked structure that is wafer-bonded onto the second surface of the interlayer dielectric layer, and wherein the stacked structure comprises a silicon dioxide layer, a barium titanate layer, and a silicon donor wafer layer.

5. The semiconductor structure as claimed in claim 1 wherein the interconnecting layer is processed to comprise at least a passive device configurable to electrically connect at least the active optical device of the functional-oxide crystalline layer to at least a given part of the semiconductor substrate.

6. The semiconductor structure as claimed in claim 1 wherein the functional-oxide crystalline layer comprises one of: a crystalline layer, a polycrystalline layer, a heterostructure, and a superlattice.

7. The semiconductor structure as claimed in claim 1 configurable to modify the given electro-optical property of the functional-oxide material with a given externally-applied stimulus, wherein the functional-oxide crystalline layer is provided in relation to the interlayer dielectric layer so that the given electro-optical property is enhanced as desired.

8. The semiconductor structure as claimed in claim 1 wherein the interlayer dielectric layer has a surface roughness of up to 1 nm.

9. The semiconductor structure as claimed in claim 1 wherein the functional-oxide material comprises at least a perovskite.

10. The semiconductor structure as claimed in claim 1 wherein the functional-oxide crystalline layer comprises at least a barium titanate layer.

11. A method for fabricating a semiconductor structure comprising: providing a semiconductor substrate that is processed to comprise at least an optical aspect that comprises at least a silicon photonics device and at least an electronic aspect comprising at least an electronic device; forming at least an interlayer dielectric layer on the semiconductor substrate, and forming at least an electrically interconnecting layer on the interlayer dielectric layer, wherein the method further comprises: providing at least a functional-oxide crystalline layer in relation to the interlayer dielectric layer before the interconnecting layer is formed on the interlayer dielectric layer, the functional-oxide crystalline layer comprising a functional-oxide material and being processed to comprise at least an active optical device having at least a given electro-optical property, and in forming the interlayer dielectric layer, the interlayer dielectric layer is formed thereby to comprise at least two surfaces, a first surface and a second surface, the first surface being provided substantially adjacent with the semiconductor substrate so as to be in common to at least a respective part of the optical aspect and the electronic aspect, wherein the method further comprises: integrating the functional-oxide crystalline layer within the interlayer dielectric layer so that the functional-oxide crystalline layer is substantially in contact with at least the optical aspect of the semiconductor substrate with the functional-oxide crystalline layer integrated monolithically on top of at least the optical aspect of the semiconductor substrate.

12. The method as claimed in claim 11 wherein providing the functional-oxide crystalline layer is done in a temporal window substantially between forming the interlayer dielectric layer and forming the interconnecting layer.

13. The method as claimed in claim 11 further comprising: providing the functional-oxide crystalline layer on the second surface of the interlayer dielectric layer that is adjacent to the interconnecting layer.

14. The method as claimed in claim 13 further comprising: providing the functional-oxide crystalline layer in a stacked structure; wafer-bonding the stacked structure onto the second surface of the interlayer dielectric layer; and removing at least a part of the stacked structure after the stacked structure is wafer-bonded to the second surface of the interlayer dielectric layer.

15. The method as claimed in claim 11 wherein the interconnecting layer is processed at a temperature of <450° C. thereby to comprise at least a passive device configurable to electrically connect at least the active optical device of the functional-oxide crystalline layer to at least a given part of the semiconductor substrate.

16. The method as claimed in claim 11 further comprising: optically connecting at least the active optical device of the functional-oxide crystalline layer to a given part of the semiconductor substrate with at least a given optical coupling technique.

17. The method as claimed in claim 11 further comprising: processing the semiconductor substrate at a temperature of 700° C. to 1100° C. thereby to comprise at least one of the electronic aspect and optical aspect.

* * * * *